E. SCHNEIDER.
RESILIENT SUSPENSION FOR GUN CARRIAGES.
APPLICATION FILED SEPT. 29, 1917.

1,310,886.

Patented July 22, 1919.
5 SHEETS—SHEET 1.

Inventor:
Eugène Schneider
by Mauro, Cameron, Lewis Massie,
Attorneys.

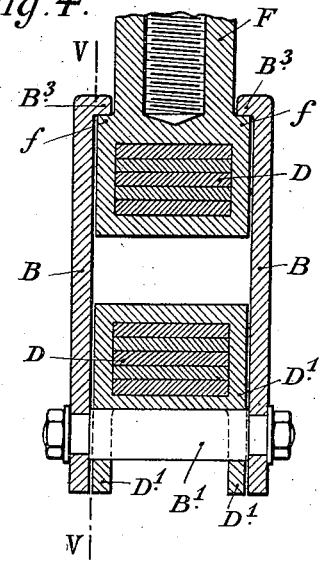
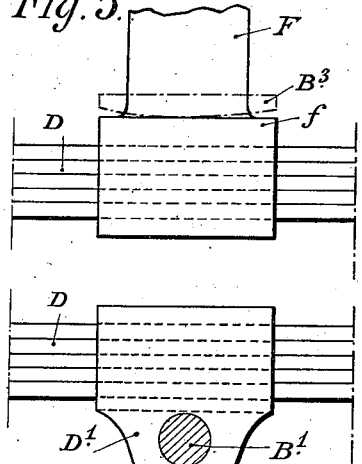
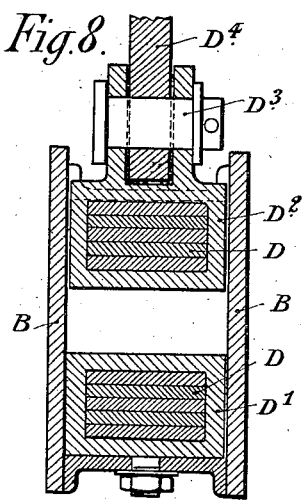
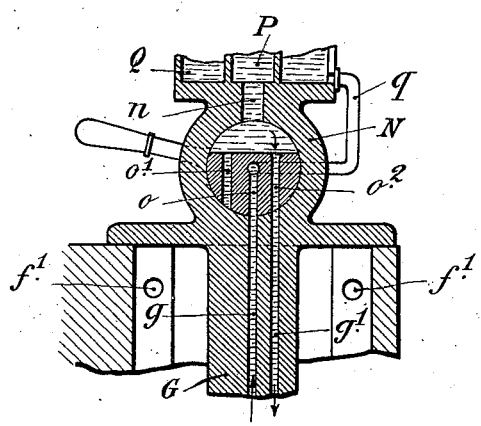

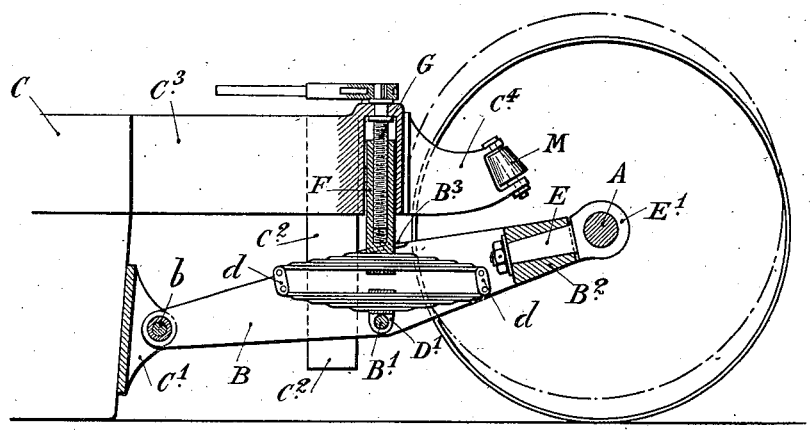
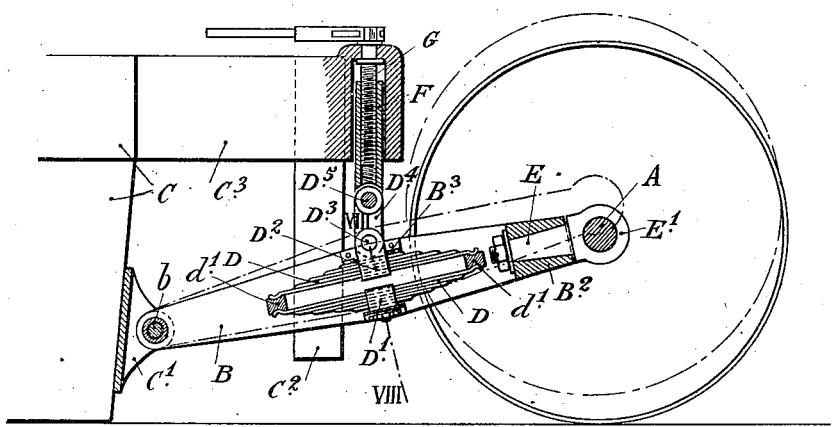

E. SCHNEIDER.
RESILIENT SUSPENSION FOR GUN CARRIAGES.
APPLICATION FILED SEPT. 29, 1917.

1,310,886.

Patented July 22, 1919.

UNITED STATES PATENT OFFICE.

EUGÈNE SCHNEIDER, OF LE CREUZOT, FRANCE, ASSIGNOR TO SCHNEIDER & CIE., OF PARIS, FRANCE, A LIMITED JOINT STOCK COMPANY OF FRANCE.

RESILIENT SUSPENSION FOR GUN-CARRIAGES.

1,310,886.     Specification of Letters Patent.     Patented July 22, 1919.

Application filed September 29, 1917. Serial No. 194,017.

*To all whom it may concern:*

Be it known that I, EUGÈNE SCHNEIDER, a citizen of the French Republic, residing at Le Creuzot, Saône-et-Loire, France, have invented a new and useful Resilient Suspension for Gun-Carriages, which is fully set forth in the following specification.

In the case of wheeled undercarriage frames of great width, such as the undercarriage frames of carriages for guns of large caliber, it is important especially when it is desired to lower the undercarriage frame on to the ground, to diminish as far as possible the extent of movement of the parts of the mechanism by which the lowering is effected.

This invention has now for its object to provide an improved wheeled axle with elastic suspension which can be lowered and which will fulfil the purposes above stated.

The manner in which this invention is to be performed will now be described with reference to the accompanying drawings wherein:—

Figs. 2 to 6 illustrate by way of example a constructional embodiment of the invention, Fig. 2 being a side elevation partly in vertical section;

Figure 2:
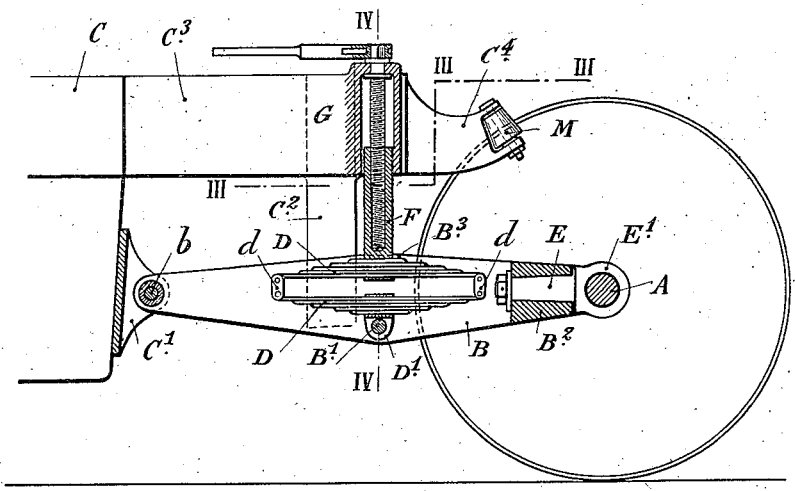
Figure 3:
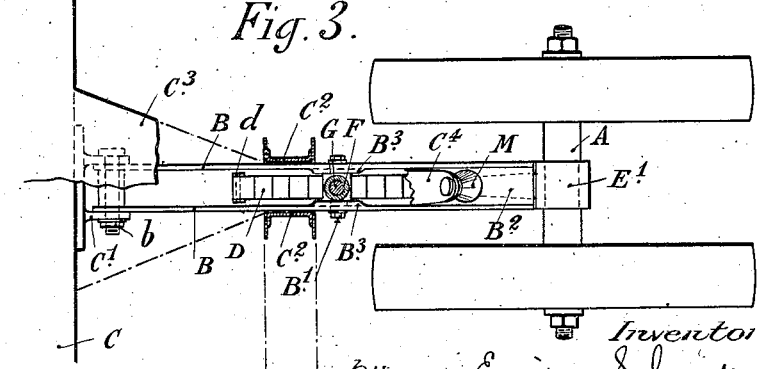

Fig. 3 a horizontal section on the line III—III of Fig. 2;

Fig. 4 a detail vertical cross section drawn to a larger scale on the line IV—IV of Fig. 2;

Fig. 5 a side view of Fig. 4 after removal of a side beam, on the line V—V of Fig. 4;

Fig. 6 a view similar to Fig. 2, showing the parts in a different position.

Fig. 7 is a longitudinal vertical section of a modification of the device for connecting together the bundles of leaf springs that constitute the elastic suspension of the beam B.

Fig. 8 is a cross section drawn to a larger scale on the line VIII—VIII of Fig. 7.

Figure 9:
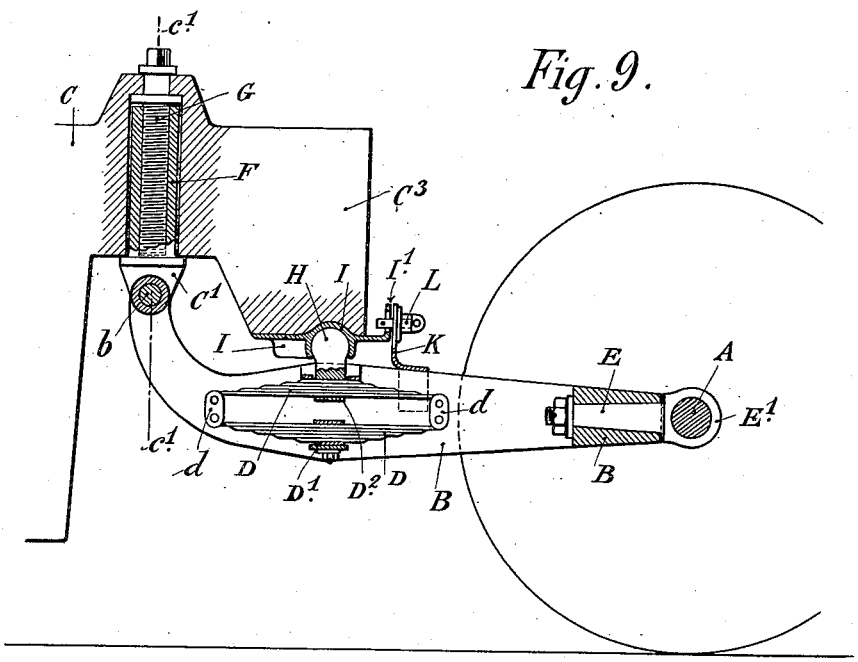

Fig. 9 is a vertical longitudinal section of another modification of the invention.

Figure 10:
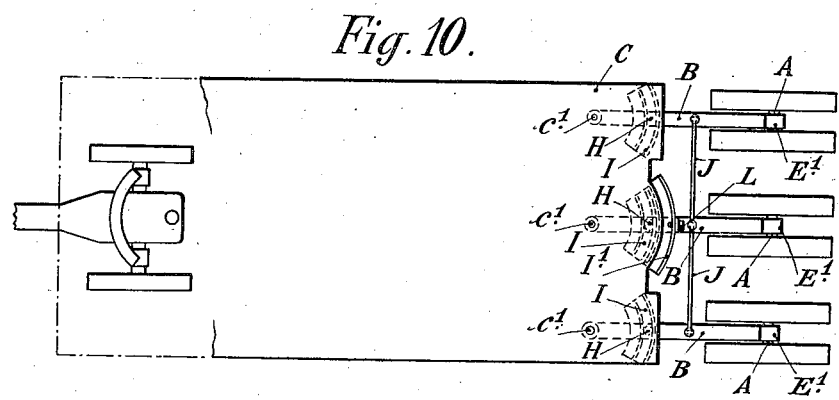
Figure 11:
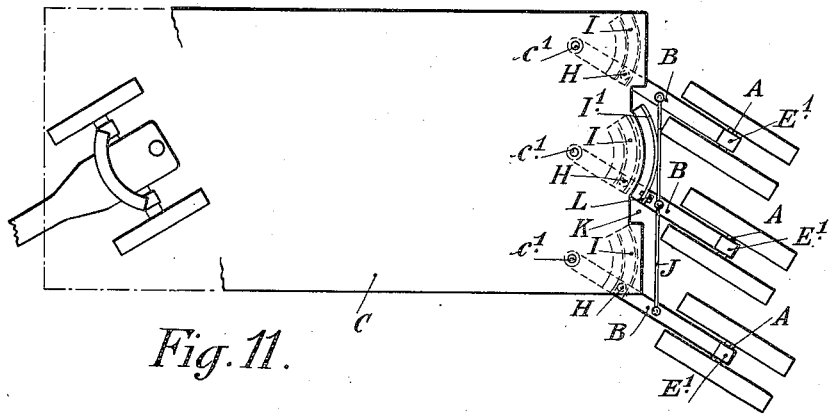

Figs. 10 and 11 are diagrammatic plans illustrating the use of a plurality of wheeled axles of the type shown in Fig. 9, as the rear axles of an undercarriage framing.

Figure 12:
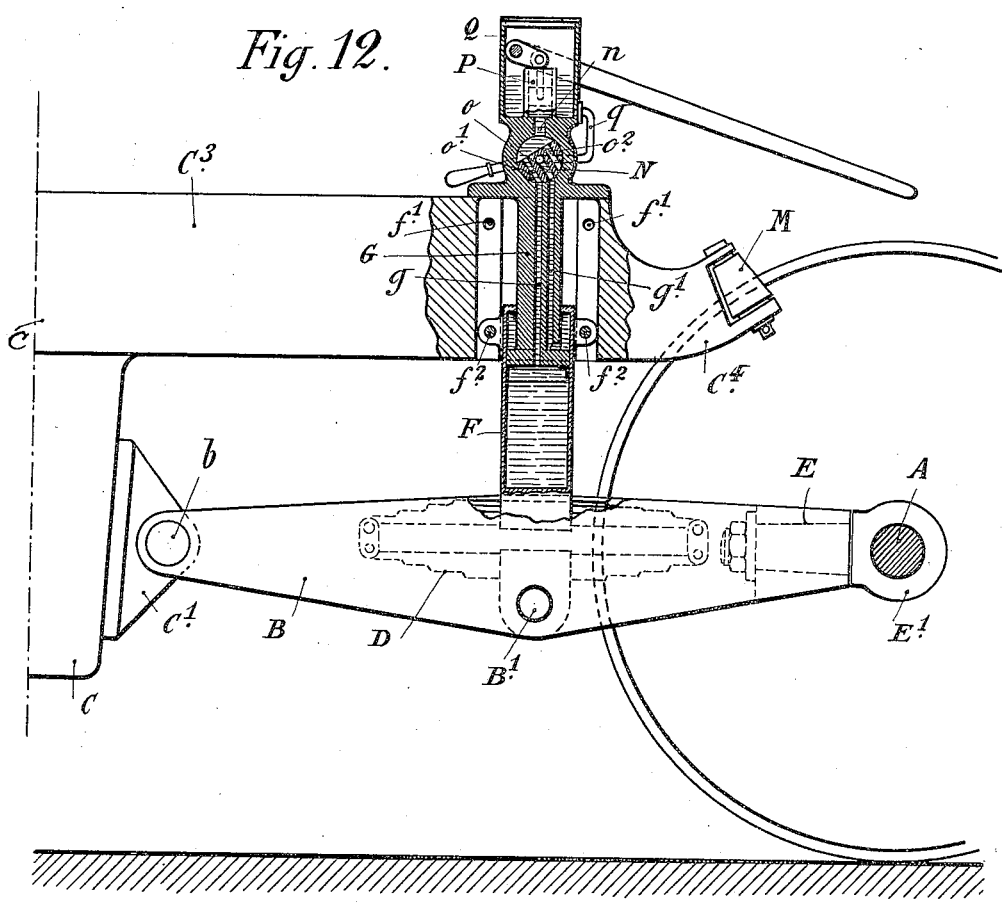

Fig. 12 is a vertical longitudinal section, showing the general arrangement of a modification of the construction shown in Fig. 2, and Fig. 13 is a cross section drawn to a larger scale of a detail thereof.

Figure 1:
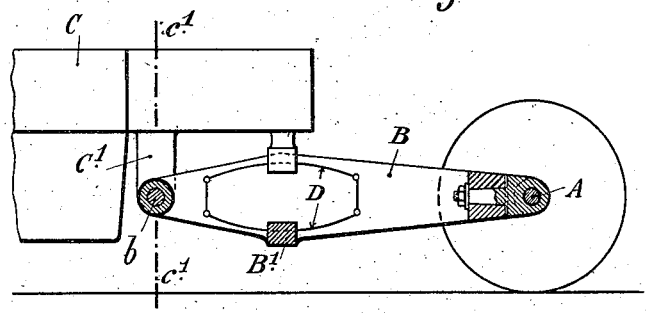
Figure 1 is a diagrammatic side elevation partly in vertical section of the improved suspension device according to this invention.

According to this invention as illustrated in Fig. 1, the axle A of each wheeled axle is jointed by means of a pivot E located at right angles to its longitudinal axis, to one end of a rocking beam B the other end of which is jointed under the undercarriage framing C by means of a horizontal transverse pin $b$, while an elastic suspension D is constituted between an intermediate point $B^1$ of the said rocking beam B and a support located under the under-carriage framing C near the end of the latter.

The support $C^1$ of the horizontal axle pin $b$ may be rendered capable of movement about its vertical geometric axis $c^1$—$c^1$ in such a manner as to allow of a horizontal turning movement of the wheeled axles.

Further, as hereinafter described, the wheeled axles may be made capable of being raised by being combined with a jack of the screw, hydraulic or other type located between the under-carriage framing and the support $C^1$ of the joint $b$, or between the undercarriage framing C and the support formed on the latter for the elastic suspension apparatus D.

Referring now to the embodiment illustrated in Figs. 2 to 6, the axle A of the wheeled axle is adapted to rotate in a head $E^1$ formed on an axle pin E journaled in a bearing $B^2$, which is adapted to pivot around the horizontal axle pin $b$ carried by the support $C^1$ formed under the under-carriage framing C. The joint E allows the wheels to continue bearing upon the ground irrespectively of the transverse profile of the road.

The elastic suspension of the rocking beam B is constructed as follows: the rocking beam consists of two plates B supporting at a point intermediate of the length of the beam, an axle pin $B^1$ serving as a lower point of support for the suspension apparatus D. The latter is formed by bundles of leaf springs connected at their ends by links $d$. The lower bundle is held on the supporting axle $B^1$ by means of a clip $D^1$. The bearing of the upper spring bundle upon the under-carriage framing is effected by one of the elements of a jack, namely, the nut F, the complementary element of which, namely the screw G, is adapted to turn in the under-carriage framing C.

The lower portion of the nut F may be so constructed as to constitute the buckle around the upper spring bundle. The un-stressing movement of the suspension apparatus when the latter no longer carries the load of the under-carriage framing, is limited by stops B³ formed on the edge of the plates of the rocking beam B, against which a shoulder f of the nut F is adapted to bear.

Fig. 6 shows the under-carriage framing C brought into contact with the ground by operating the jack G—F in the rquisite direction. When the wheeled axle has arrived in the position shown in full lines in Fig. 6, then by continuing to operate the jack in the same direction, the axle can be raised and the wheels can be brought into the position indicated in dash and dot lines in the said figure.

Means may be provided for guiding the rocking beam B in its oscillation on the axle pin b, the beam being formed by two side plates C² projecting under a nose C³ on the said framing.

In order to prevent any possibility of the wheels striking the side plates of the rocking beam B in the oscillating movements of the axle around the axle pin E, a roller M of truncated conical shape (Figs. 2 and 3) may be located in an extension C⁴ of the nose C³ for the purpose of limiting such oscillating movements.

In the modification illustrated in Figs. 7 and 8, the upper and lower spring bundles are connected by cross members d¹ instead of being connected with their longest leaves by means of clips.

The spring apparatus D instead of bearing upon an axle pin, is arranged to bear upon a fixed point of the rocking beam B.

The buckle of the upper spring bundle is connected by means of an axle pin D³ to a link D⁴ connected by means of an axle pin D⁵ to the nut F of the jack F—G.

In the constructional examples hereinbefore described, it is to be noted that owing to the location of the wheeled axles at the end of a rocking beam jointed to the under-carriage framing, raising and lowering movements of the under-carriage framing, as well as the raising movements of the wheeled axles, are produced with a very short stroke of the movable element of the jack.

Referring to the embodiment shown in Fig. 9, the axle b for jointing the rocking beam B is carried by a support C¹ adapted to pivot in the under-carriage framing C about a vertical axis $c^1$—$c^1$ whereby the rocking beam B is enabled to be turned horizontally with relation to the under-carriage framing C.

The support of the suspension apparatus B—D under the under-carriage framing is in this case constituted by a spherical headed pin H held in a circular socket I.

The movements for lowering and raising the under-carriage framing may be produced by means of a jack F—G consisting of a screw G and a support C¹ which in this case will be constructed in the form of a nut F.

Referring to the construction shown in Figs. 10 and 11, the rocking beams B of the rear axles of an under-carriage framing may be connected two by two by connecting rods J; they may be fixed in any desired position of horizontal rotation. One of the rocking beams B is provided for this purpose with a support K (Figs. 9, 10 and 11) for a spring bolt L which is adapted to be engaged at will into any one of the sockets or any one of the notches formed in a projection I¹ of the guiding arc I. Fig. 10 shows the normal position of the wheeled axles for traveling in a straight line. Fig. 11 shows the wheeled axles in a position of extreme horizontal rotation.

In the construction shown in Figs. 12 and 13, the jack F—G is of the hydraulic type. The element F bearing upon the elastic suspension apparatus D—D, consists of a cylinder filled with liquid adapted to move over a piston fixed in the under-carriage framing. The piston G is pierced with two longitudinal passages g, g¹ opening at their lower ends respectively on to the lower face and upper face of the said piston. At their upper ends these passages open into a casing N in which works a cock plug having three ways, namely, an axial way o and two side ways o¹, o². The cock casing N communicates at its upper part through a passage n, with a pump P worked by hand or power, supplied with liquid from a tank Q. The axial way o of the cock communicates permanently through a passage q with the tank Q.

For traveling, when the raisable wheeled axle A bears with its wheels upon the ground, the cylinder F may be locked in place on the under-carriage framing by means of keys f² engaging in corresponding lodgments in the under-carriage framing. When it is desired to lower the under-carriage framing and raise the wheeled axle, these keys are removed. For the purpose of bringing first the under-carriage framing into contact with the ground, the cock is turned into the position shown in Fig. 13.

The liquid confined in the cylinder F between the under face of the piston G and the lower end of the said cylinder, is forced through the passages g, o and q into the tank Q. When the under-carriage framing has come into contact with the ground, the cock plug is kept in the same position, and the pump is operated. The liquid under pressure is forced through the passages $o^2$ and $g^1$ into the cylinder F above the piston, with the result that since the under-carriage framing is fixed, the cylinder F is caused to move up relatively to the piston. When the wheeled axle has been lifted into the desired position, it can be locked in position by engaging the keys $f^2$ into the lodgements $f^1$.

Inversely, when starting from the position of contact with the ground, or from an intermediate position, it is desired to return the under-carriage framing into the elevated position shown in Fig. 12, the cock plug is turned into the position it occupies in the said figure and the pump is then operated. The liquid under pressure is thereby forced through the passages $o^1$ and $g$ under the piston, while the upper face of the latter is in communication through the passages $g^1$-$o$, $q$, with the tank Q which is open to the atmosphere.

What I claim is:—

1. In combination a wheeled carriage axle, a gun carriage frame supported thereon and provided with an undercarriage frame adapted to be lowered to rest on the ground, a rocking beam having one end hinged to said undercarriage frame and having the opposite end supported by the wheeled carriage axle, and depressing and elevating means mounted on the carriage frame and having connection with said beam for lowering said undercarriage to rest on the ground and by continued movement to then elevate the wheeled axle.

2. In suspension apparatus for a wheeled axle supporting a gun carriage, the combination with said carriage and said wheeled axle, of a rocking beam having at its outer end at pivot connection with said wheeled axle to permit the latter to move in a plane normal to said beam, and carried at its inner end on said carriage by means of a transverse horizontal pivot, and an elastic suspension device located between an overhanging portion of said carriage, and said rocking beam, so that load is transmitted elastically from said overhanging portion to said rocking beam, and a jack whereof one element is connected to said carriage, and the other element is connected to said elastic suspension device.

3. In suspension apparatus for a wheeled axle supporting a gun carriage, the combination with said carriage and said wheeled axle, of a jack whereof one element is connected to said carriage, the other element being capable of vertical movement in relation to said carriage, a rocking beam having at its outer end a pivot connection with said wheeled axle to permit the latter to move in a plane normal to said beam, and journaled at its inner end on a transverse horizontal pivot carried by said other element of said jack, and an elastic suspension device located between an overhanging portion of said carriage and said rocking beam so that load is transmitted elastically from said overhanging portion to said rocking beam.

In testimony whereof I have signed this specification in the presence of two subscribing witnesses.

EUGÈNE SCHNEIDER.

Witnesses:
  CHAS. P. PRESSLY,
  ANDRÉ MOSTICKER.

Copies of this patent may be obtained for five cents each, by addressing the "Commissioner of Patents, Washington, D. C."